United States Patent

Ross et al.

[15] 3,656,154

[45] Apr. 11, 1972

[54] APPARATUS FOR CONVERTING A CYCLIC ANALOG SIGNAL TO A DIGITAL SIGNAL

[72] Inventors: Joseph A. Ross, Fort Salonga; Hakan O. Hemdal, Huntington, both of N.Y.

[73] Assignee: Potter Instrument Company, Inc., Plainview, N.Y.

[22] Filed: Sept. 9, 1970

[21] Appl. No.: 70,754

[52] U.S. Cl. .................................................. 340/347 AD
[51] Int. Cl. ....................................................... H03k 13/175
[58] Field of Search ..................... 250/337 G; 340/347 AD

[56] References Cited

UNITED STATES PATENTS 3,521,270  7/1970  Heinecke ..................... 340/347 AD

*Primary Examiner*—Thomas A. Robinson
*Assistant Examiner*—Jeremiah Glassman
*Attorney*—Laurence J. Marhoefer

[57] ABSTRACT

The specification and drawings disclose 10 photocells arranged to view a full cycle of a space distributed analog signal. Each photocell is coupled to the input of an amplifier whose output rests in one binary state if the input exceeds one level and rests in another binary state if its input falls below another level. Of the large number of combinations in which the binary outputs of the amplifiers can exist, logic circuitry responsive to certain combinations only produces one unique output for each incremental displacement of the periodically varying signal.

1 Claims, 5 Drawing Figures

PATENTED APR 11 1972
3,656,154
SHEET 1 OF 2
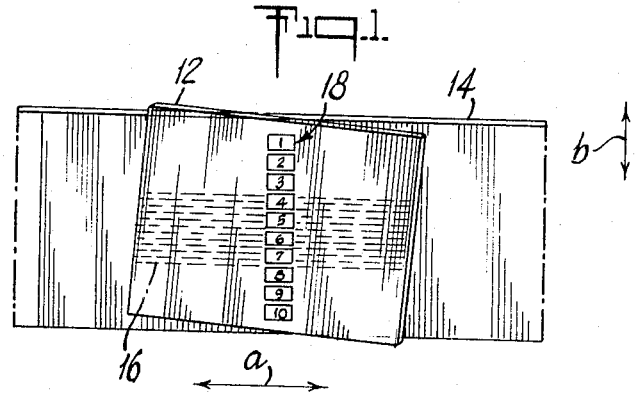
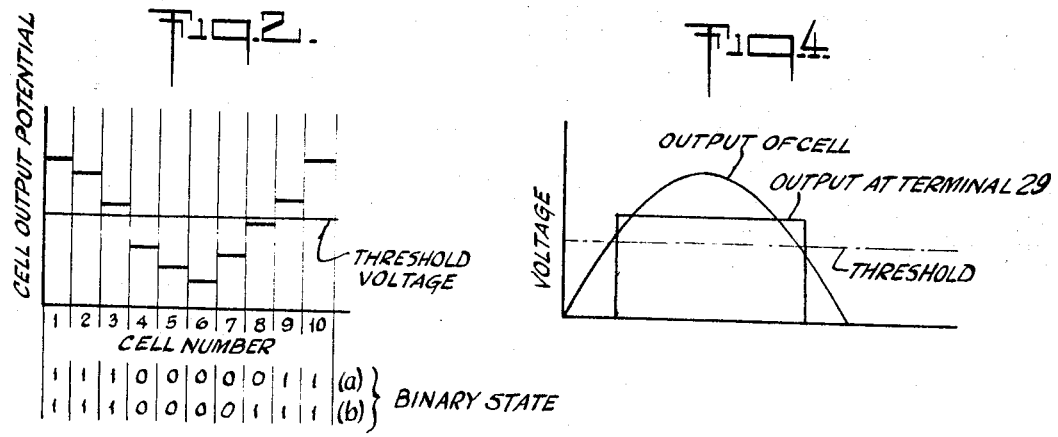
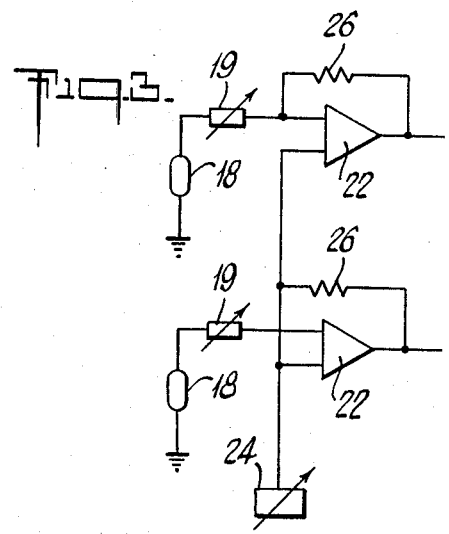
INVENTORS
JOSEPH A. ROSS
HÅKAN HEMDAL
BY Laurence J. Marhoefer
ATTORNEY

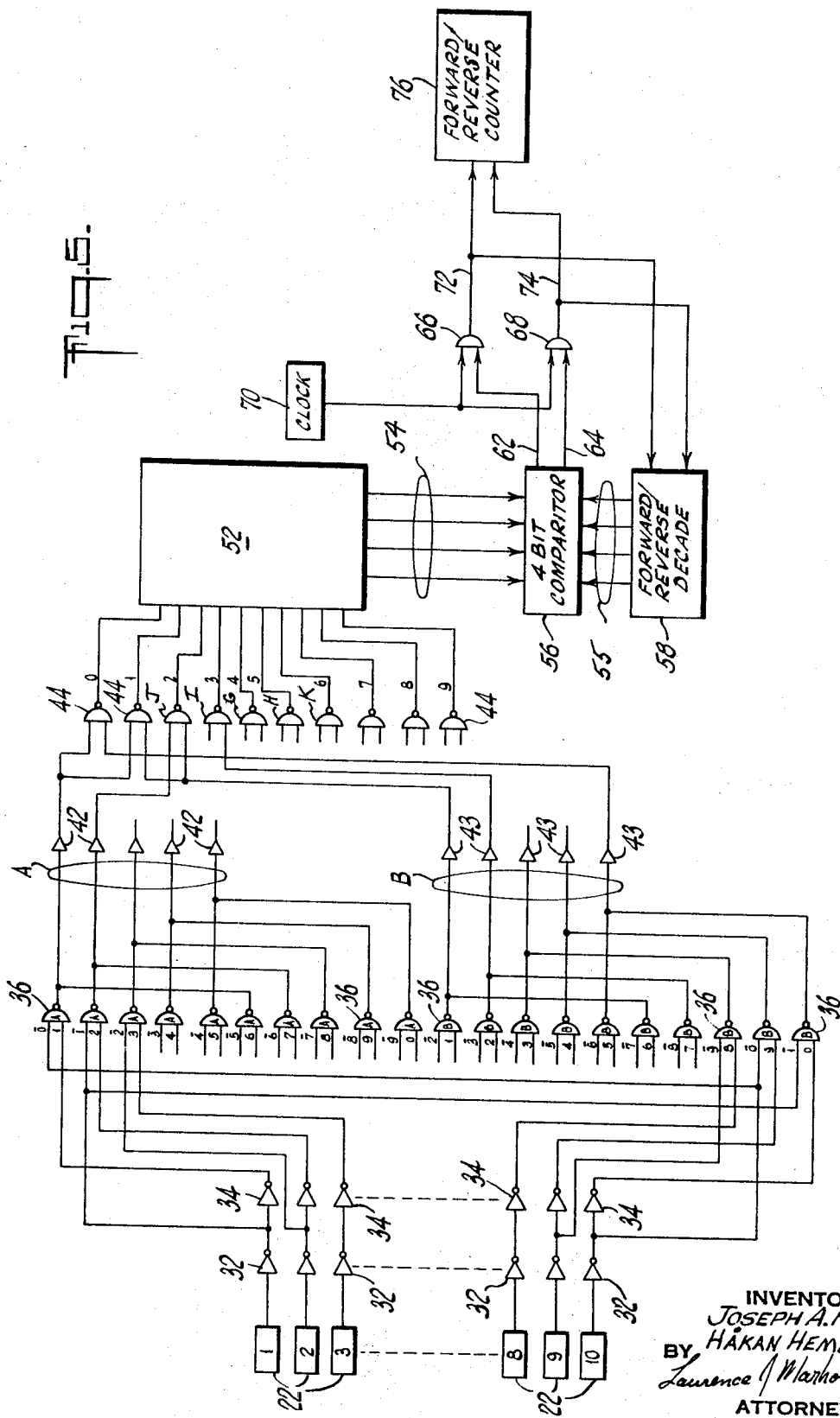

3,656,154

APPARATUS FOR CONVERTING A CYCLIC ANALOG SIGNAL TO A DIGITAL SIGNAL

BACKGROUND OF THE INVENTION

This invention relates to apparatus for precisely measuring relative displacements and, more particularly, to an improved system for converting a periodically varying signal generated as two members move relatively to one another into a digital signal indicative of their relative displacement.

One very widely used technique for measuring relative displacement between two members is to use a transducer which generates a periodic signal as the members move relatively to one another. The invention described herein most particularly relates to systems employing, as transducers, optical gratings which produce a periodically varying shadow or fringe as the members move, and the remainder of the specification is directed toward such systems. However, as will be apparent to those skilled in the art, certain aspects of the invention may be employed advantageously with other transducer systems.

In displacement measuring systems of the prior art, which employ optical gratings, two or more spaced-apart photocells produce, respectively, sinusoidal varying output signals as the fringe passes over them. The number of cycles (or parts thereof) are counted as a measure of the extent of movement and the relative phase of the outputs determines the direction of movement.

While such prior art systems are generally satisfactory, they have a number of disadvantages and limitations. They are sensitive to spurious noise signals and their quiescent outputs tend to drift owing to the fact that the photocell generates low-level analog signals which are directly coupled to the utilization circuitry. In addition, the periodic signal of prior art systems must be subdivided electronically into a number of segments in order to provide a system with reasonably high resolution; and, as will be appreciated by those skilled in the art, the number of segments into which the signal can be divided is limited. Finally, in prior art systems it is difficult to provide the system with a sufficiently broad bandwidth to respond to high frequency signals, thus limiting the upper speed at which the two members whose displacement is being measured can move.

The object of this invention is to provide an improved measuring system which is immune to noise and drift, which can be economically constructed, which has a high resolution, and which has a broad frequency response.

SUMMARY OF THE INVENTION

Briefly, this invention contemplates the provision of an array of closely spaced photocells over which the fringe passes. Each photocell respectively is coupled to an operational amplifier whose output switches from zero to full output as the output of the photocell crosses a certain threshold level. Each time the output of an amplifier switches, a count is recorded. The photocell array outputs can be combined logically in groups of three and direction determined from the sequence of switching. Preferably, however, direction of motion is determined by assigning an absolute value to each state of the photocell array and detecting whether the absolute value increases or decreases.

BRIEF DESCRIPTION OF THE DRAWINGS

Having briefly described this invention, it will be described in greater detail along with other objects and advantages in the following detailed description of a preferred embodiment which may be best understood by reference to the accompanying drawings. These drawings form part of the instant specification and are to be read in conjunction therewith. Like reference numerals are used to indicate like parts in the various views;

FIG. 1 is a schematic view of a 10-photocell array of a preferred embodiment of this invention and two transmission gratings disposed to generate a vertically moving fringe as the gratings move horizontally;

FIG. 2 is a plot of the output signal levels of the photocells labeled 1 - 10 in FIG. 1;

FIG. 3 is a schematic drawing showing photocells coupled to operational amplifiers;

FIG. 4 is a graph of photocell output and operational output as a function of displacement of the gratings; and FIG. 5 is a schematic drawing of a preferred embodiment of this invention.

DESCRIPTION OF THE PREFERRED EMBODIMENTS

Referring now to FIG. 1 of the drawings, an optical grating 12 is mounted on a member (not shown) which moves back and forth in the direction indicated by arrow $a$ relative to a second similar grating 14. The line of the gratings are slightly skewed with respect to one another and they generate a shadow 16 which moves transversely (direction of arrow B in FIG. 1) with respect to the direction of motion as is well understood by those skilled in the art.

An array of ten photocells generally indicated by the reference number 18 is positioned behind the grating 14 and supported by a suitable fixture coupled by a bracket or other suitable mount so that the array moves with the grating 12. Light, preferably from a source also carried by the bracket, shines through the gratings 12 and 14 and onto the photocells 18. The bracket and light source have not been shown in the drawing since the arrangement is well known in the art.

As the shadow 16 moves across the array of photocells 18, the output of each cell varies in a generally sinusoidal fashion. FIG. 2 illustrates the approximate relative magnitude of the outputs from the cells 1 through 10 for a position of shadow 16 approximately as shown in FIG. 1.

Referring now to FIGS. 3 and 4, one terminal of each of the photocells 18 is coupled to a suitable reference potential indicated here as ground, and its other terminal is direct current (d.c.) coupled via a variable impedance network 19 to one input of a high gain operational amplifier 22. The other input terminal of each amplifier 22 is connected preferably to a common variable reference potential 24. The amplifier 22 should have sufficient positive feedback to provide it with hysteresis and prevent oscillation in the circumstances when the output of photocell 18 is approximately equal to the potential of reference 24. It should be noted that the threshold level of all the amplifiers may be adjusted simultaneously. A suitable impedance network 26 coupling the output and input provides the positive feedback needed for the desired hysteresis. With this hysteresis and with a common threshold adjustment, the photocells can readily be adjusted so that the outputs of the amplifiers switch sequentially at the leading and trailing edges of the fringe as it moves across the photocells.

As illustrated in FIG. 4, the output terminal 29 of amplifier 22 rests at ground potential until the output of the photocell 22 reaches the potential of reference source 24. When it reaches this potential, the output of amplifier 22 increases abruptly to a higher value and thereafter remains substantially constant until the input from photocell 18 falls below the reference level. Thus, it will be appreciated that each of the photocells 18 and operational amplifiers 22 in combination serves as a binary or two-level input device for the remainder of the system.

Referring again to FIG. 2, the array of ten photocells 18 span one full cycle (360°) of the fringe generated by the gratings 12 and 14. For the conditions illustrated in FIG. 1, for example, photocells 1, 2, and 3 are in the binary one state; photocells 4, 5, 6, 7, and 8 are in the binary zero state; and photocells 9 and 10 are in the binary one state. These binary states of the photocell array are indicated in FIG. 2 by 1's and 0's. It should be noted that the precise location of the fringe with respect to the gratings can be determined by detecting those adjacent pairs of photocells whose outputs are of opposite binary states. In FIG. 1, photocells 3 and 4 are one such pair and photocells 8 and 9 are the other. When the shadow 16 moves upwardly and uncovers photocell 8, for example, but does not cover photocell 3 sufficiently, the output of the photocell array 18 is that shown in row (b) with adjacent photocells 7 and 8 now producing outputs of binary value. Thus, it will be appreciated that incremental movement of the shadow 16 results in successive changes in the adjacent pairs of photocells 18 which produce outputs of opposite states.

The direction of relative movement of the gratings 12 and 14 can be determined by electronically grouping the photocells in groups of three and detecting the sequence of change as in the prior art. However, in a preferred embodiment of this invention, a value from 0 to 9 in sequence is assigned to each adjacent pair of photocells so that each photocell pair whose outputs rest in different binary states produces an output ranging between 0 and 9. Direction is determined by detecting whether the photocell pair in opposite states following incremental movement has a higher or lower absolute value than the preceding state. It should be noted that assigning a value to each array output combination enhances the noise immunity of the system.

Referring now to FIG. 5 which shows a preferred embodiment of the invention, the output of each operational amplifier 22 is coupled to the input of an inverting amplifier 32. Leads couple the output of each inverting amplifier 32, whose output is high when the output of amplifier 22 is low and is low when the output of amplifier 22 is high, to one input terminal of two NAND gates 36. As there are ten cells in the array, there are consequently 20 NAND gates. The upper most ten gates 36 marked A provide information concerning the leading edge of the fringe 16 and the lower most 10 gates marked B provide trailing edge information. A second inverting amplifier 34 associated with each operational amplifier 32 has an output which is high when the output of amplifier 22 is high and an output which is low when the output of amplifier 22 is low. Leads couple the output of each amplifier 34 to the other input terminals of two of the gates 36. As may be noted from an inspection of FIG. 5, each gate 32 in group A has inputs derived from adjacent photocells; one input indicative of the binary state of a cell and the other input of the binary state of the adjacent preceding cell inverted. Similarly, group B gates 32 have, as one input, a signal indicative of the binary state of one cell and, as the other input, the binary state of the next succeeding cell inverted.

Each group A NAND gate 36 provides a logically false (low) output only when the fringe 16 covers a photocell coupled to one of its inputs and exposes the preceding adjacent cell coupled to its other input. Similarly, each gate 36 in group B has a logical false (low) output only when a photocell coupled to one of its inputs is covered, and the next succeeding cell coupled to its other input is exposed.

The outputs of gates 36 whose inputs are from photocell pairs positioned approximately 180° apart in groups A and B, respectively, are coupled together in order to multiplex the outputs, forming two groups of five output signal lines denominated respectively: 01, 23, 45, 67, 89, and 12, 34, 56, 78, 90. Thus, as the fringe 16 passes through a complete cycle of 360°, 10 output signals appear on the five output lines from the group A gates and 10 output signals appear on the five output lines from the group B gates. It should be recalled that the output/input characteristic of each amplifier 22 has hysteresis and that the threshold of the amplifiers 22 is adjustable so that the group A and group B outputs change alternately as the fringe moves and not simultaneously as would be the case if the system were symmetrical.

An inverting amplifier 42 couples, respectively, each of the five output lines of group A to one input terminal of an array of 10 NAND gates 44; each line being couplet to one input terminal to two of the gates 44. Similarly, an inverting amplifier 43 couples, respectively, the five output lines of group B to the other input terminals of gates 44; each line again being coupled to two of the gates 44. Each NAND gate 44 produces a logically true (high) output only when both its inputs are logically true. Due to inverting amplifiers 42 and 43, it will be appreciated that the input lines to gates 44 are logically false except in the region of the edges of the fringe 16 where the amplifiers 22 connected to adjacent photocells are in different binary states. The output of each gate 44 is assigned sequentially a numerical value from 0 to 9 as indicated in the drawings.

Each pair of gates 44 having one input from the same group A output has inputs from group B outputs of the two photocell pairs disposed approximately 180° away from the pair generating the group A input. For example, the group A output generated when photocell 2 is uncovered and photocell 3 is covered is gated with the outputs derived from the photocell outputs pair 7 and 8 and the photocell pair 8 and 9. In operation, if the output of photocell 2 is logically true and the output of photocell 3 is logically false, one input to the gate 44 marked G is true and one input to the gate marked H is true. With the fringe 16 in such a position either the output from photocell 7 may be logically false and the output from photocell 8 may be logically true or, alternatively, the output from photocell 8 may be logically false and the output from photocell 9 may be logically true.

If the output of photocell 7 is logically false and the output of photocell 8 is true, both inputs to gate G are true and there is an output signal on line 4. If the output of photocell 8 is false and the output of photocell 9 is true, both inputs to gate H are true and there is an output on line 5. Assuming this latter condition exists (i.e., there is an output on line 5), as the fringe 16 moves upwardly the output of photocell 8 will switch to a true state before cell 2 switches to a false state due to the hysteresis in the amplifiers 22 and the reference potential. Now, with cell 7 false and cell 8 true, both inputs to gate G are true and there is an output signal on line 4 but no signal on line 5 since one input to gate H is now false. Further upward movement of fringe 16 next causes the output from cell 2 to become false; with cell 2 false and cell 1 true, both inputs to gate I are true and an output signal appears on line 3.

Again assuming the condition with an output signal on line 5, as the fringe moves downwardly, the output of photocell 3 becomes true before the output of cell 8 becomes false. In this case, both inputs to gate K are high and an output signal appears on line 6.

Thus, it will be appreciated that as the fringe 16 moves incrementally through 180°, output lines 0 to 9 of gates 44 are sequentially activated. As the fringe moves upwardly, for example, the value of the line which is activated decreases; and, if the fringe moves downwardly, the assigned value of the line which is activated increases. Thus, the outputs of gate 44 provide an indication of the magnitude and direction of movement of the gratings.

The output lines 0 to 9 are coupled to a decimal to binary-coded-decimal converter 52 of suitable logic design known in the art. Converter 52 provides a binary coded decimal output on lines 54 of the assigned numeric value of the logical true output of gates 44. Lines 54 are coupled as one input to a comparator 56 whose other input is coupled to a forward/reverse decade counter 58.

If the numeric value of the input to comparator 56 from converter 52 exceeds the numeric value of the input from counter 58, an output signal on line 62 enables an up-count AND gate 64. If the numeric value of the input from converter 52 is less than the input from counter 58, an output signal on line 64 enables a downcount AND gate 68. When the numeric value of the inputs to comparator 56 are equal, neither gate 66 nor gate 68 is enabled.

Leads couple the other input terminals of gates 66 and 68, respectively, to a high frequency clock-pulse generator 72. Each time the comparator enables gate 66 or gate 68, a pulse appears at output terminals 72 or 74, respectively, which are coupled both to a forward/reverse counter 76, which serves to indicate the net relative movement between the gratings, and the forward/reverse counter 58.

A pulse at output terminal 72 advances the count in both counters 76 and 58 and a pulse at terminal 74 decreases the count in both counters. Gate 66 or gate 68 remains enabled following movement of the fringe 16 until the output of counter 58 matches the output of converter 52. It should be noted that the output frequency of clock pulse source 72 may be quite high relative to the frequency of the signal generated by the gratings so that counters 58 and 76 can track each incremental signal generated. It should also be noted that comparator 56 includes logic circuitry commonly known in the art as wrap-around logic, which interprets changes from 9 to 0 or 0 to 9 as continuous increases or decreases, respectively, in the input signal.

Thus, it will be appreciated that the objects of the invention have been accomplished. The system is DC coupled and provides a flat response over an extremely wide frequency range. This system is immune to noise because of the $2^{10}$ possible states which ten photocells can assume, only twenty states are utilized. The remaining states have no effect on the system output. Furthermore, since the system is DC coupled and encodes the position of the shadow as an absolute value, there is a continuous retransmission redundancy which further enhances the noise immunity of the system.

It will be understood that certain features and subcombinations are of utility and may be employed without reference to other features and subcombinations. This is contemplated by and is within the scope of the claims. It is further obvious that various changes may be made in details within the scope of the claims without departing from the spirit of the invention. It is, therefore, to be understood that this invention is not to be limited to the specific details shown and described.

What is claimed is:

1. Apparatus for converting a cyclic analog input signal to a digital output signal comprising in combination:

a plurality of sensors distributed in space, each of said sensors producing an output signal proportional to the magnitude of the analog input signal in the vicinity of said sensor, a plurality of amplifiers, each of said amplifiers producing one binary output signal when an input signal coupled thereto exceeds one level and another binary output when said input signal falls below another level, means for coupling each one of said sensor output signals as an input respectively to each one of said amplifiers, logic circuitry having a plurality of output signal lines each of which is driven by said logic circuitry to one or the other of two binary states, means coupling the outputs of said amplifiers to said logic circuitry, said logic circuitry driving said output lines to produce a unique combination of binary states on said output lines in response to variations in the magnitude of said analog input signal, and said logic circuitry including means preventing changes in the binary value of said output lines except in response to outputs from amplifiers coupled to adjacent sensors which are of opposite binary value and only then if the outputs of amplifiers coupled to sensors displace approximately 180° with respect to said cyclic analog signal are also of opposite binary states.

* * * * *